Dec. 25, 1962 W. R. OWENS 3,070,111
APPARATUS FOR PRECISELY REGULATING THE FLOW
OF FLUID IN A CONTROLLED FLUID LINE
Filed Feb. 26, 1960 3 Sheets-Sheet 1

INVENTOR
WILLIAM R. OWENS
BY
George H. Riches
ATTORNEY

INVENTOR
WILLIAM R. OWENS
BY
George H. Riches
ATTORNEY

Dec. 25, 1962 W. R. OWENS 3,070,111
APPARATUS FOR PRECISELY REGULATING THE FLOW
OF FLUID IN A CONTROLLED FLUID LINE
Filed Feb. 26, 1960 3 Sheets-Sheet 3

INVENTOR
WILLIAM R. OWENS
BY
George H. Riches
ATTORNEY

United States Patent Office 3,070,111
Patented Dec. 25, 1962

3,070,111
APPARATUS FOR PRECISELY REGULATING THE FLOW OF FLUID IN A CONTROLLED FLUID LINE
William R. Owens, Downsview, Ontario, Canada
Filed Feb. 26, 1960, Ser. No. 11,336
4 Claims. (Cl. 137—101.21)

This invention relates to an apparatus for automatically and precisely regulating the flow of fluid in a controlled line and in particular for automatically and precisely controlling and regulating the blend of two or more fluids.

One object of the invention is to provide a control for a single flow from a source of fluid to deliver at the point of delivery the precise quantity specified with extreme accuracy.

An object of the present invention is to adapt the control apparatus for controlling the blend of two or more fluids to produce specification products with extreme accuracy under unstable conditions common to many blending operations.

One of the disadvantages of the blending systems presently in use is that while they will automatically adjust themselves to variable conditions so as to maintain a uniform flow for the desired blend, they will not make up the shortage or subtract the excess resulting from unstable conditions during the time it takes to return to control.

One of the objects of the invention is, therefore, to provide an apparatus that will automatically make up the shortage or subtract the excess flow caused by unstable conditions which may be experienced during a blending operation.

In carrying out this and other objects, the apparatus makes use of electronic devices and in its simplest application is used to control a single flow so as to deliver at the delivery point the quantity specified with extreme accuracy. In the single flow the apparatus for automatically and precisely regulating the flow of the fluid in a controlled line comprises the combination of a fluid line communicating with a source of fluid and a point of delivery, a pump for causing fluid to flow from the source to the point of delivery, a metering device, a source of electric energy having a voltage varying directly as to the flow through the metering device, a regulating valve in said line between said metering device and the source of fluid and having electrically operated means in circuit with the source of electric energy for controlling the flow of fluid through the valve, a voltage sensitive potentiometer having its leading side in circuit with said source of electric energy, a manually variable resistor in circuit with the other side of the potentiometer for setting a desired value whereby any departure from the setting produces an error signal, and means to sense the error signal including a memory device in circuit with the potentiometer and responsive to the error signal from the potentiometer to automatically vary the resistance to the generator output circuit whereby an interruption which causes a reduced flow will increase the resistance in the output circuit automatically regulating the valve to cause an increased flow to the amount of the error and reversing the action when conditions cause an extra flow.

A further object of the invention is to provide a control system which will maintain any desired relationship between two or more fluids to produce a blend according to the specifications laid down for the product or blend with extreme accuracy under unstable conditions in blending operations.

The apparatus for automatically and precisely regulating the flow of the individual fluids to be blended to produce a blend according to the laid down specifications comprises the combination of a first supply of the first fluid, a first conduit communicating with the first supply and a point of delivery, a pump for causing the fluid to flow from the first supply to the point of delivery, a first metering device in the conduit, a source of primary electric energy having a voltage varying directly as the flow through the metering device, a second supply of second fluid, a second conduit communicating with the second supply and the point of delivery, means for blending the two fluids prior to the point of delivery, a second metering device in the second conduit, a source of secondary electric energy having a voltage varying directly as the flow through the metering device, a regulator valve in the second conduit between the second metering device and the second supply and having electrically operated means in circuit with the primary electric energy for controlling the flow of fluid through the valve, a voltage sensitive potentiometer in the circuit of the primary electric energy and having its leading side in circuit with the primary electric energy, a manually variable resistor in the primary electric energy circuit between the potentiometer and the primary source of electric energy for setting a desired value whereby any departure from the setting produces an error signal, means to sense any departure of the potentiometer from a desired value including a memory device in circuit with the other side of the potentiometer and responsive to the error signal from the potentiometer to automatically vary the resistance of the output circuit of the secondary source of electric energy, whereby an interruption which causes a reduced flow in the second conduit will increase the resistance to the output of the secondary source of electric energy automatically regulating the valve to cause an increase flow in the second conduit to the amount of the error and reversing the action when conditions cause an increase flow in the second conduit.

Other and further objects and advantages of the invention will be apparent from the following description and the accompanying drawings which illustrate embodiments of the same and in which.

In the following specification, it is to be understood that the terms used herein are used as words of explanation and not as limitations since it will be obvious that equivalent apparatus may be substituted for that described.

Figures 1, 2:
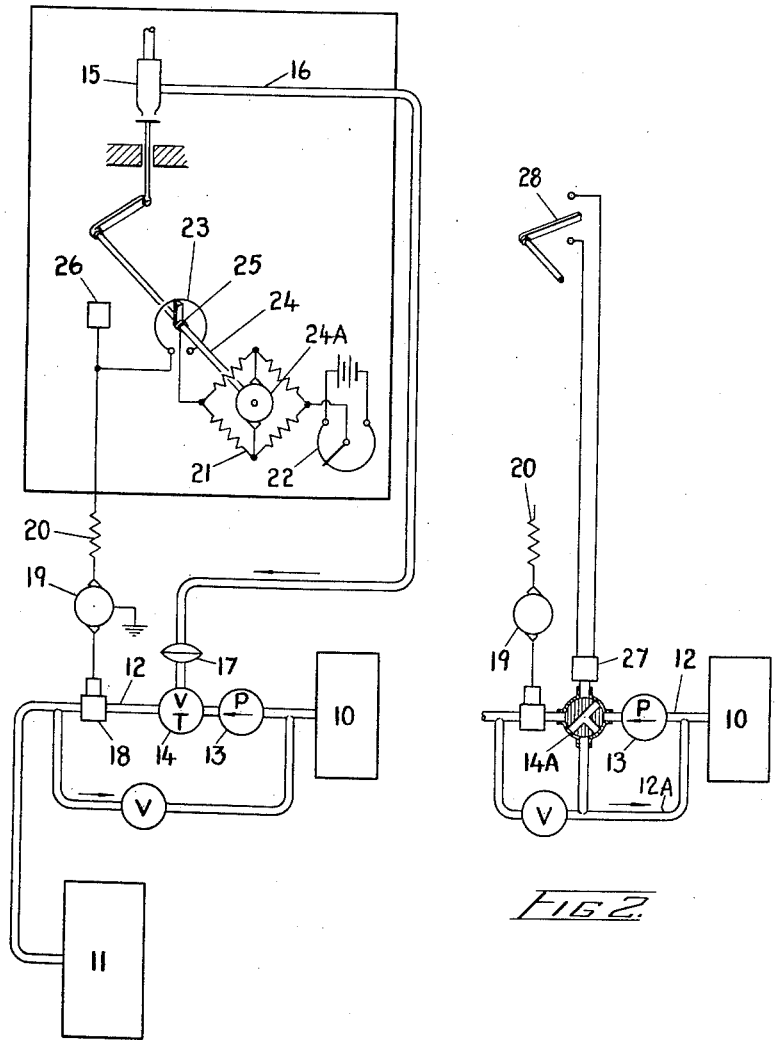
FIGURE 1 is a schematic view of a control apparatus for use in a single flow system.
FIGURE 2 is a modification of the valve system employed for regulating the flow of fluid.

Referring first to FIGURES 1 and 2, the apparatus therein illustrated is constructed for setting an exactly controlled rate of a single fluid flow. The apparatus comprises a source of fluid 10, which is being delivered to a delivery point 11 through a conduit 12 by means of a pumping device 13. Inserted in the line 12 between the pump 13 and the delivery point 11 is a throttle valve 14 which controls the rate of flow through the conduit, the valve being controlled by a transducer 15, air line 16 and the standard diaphragm pneumatic operator 17 which upon flexing in response to transducer 15 will regulate the valve 14 to increase or decrease the flow of fluid therethrough as hereinafter described.

The fluid, after passing through the valve 14, passes through a metering device which may be a differential meter, rotary meter or magnetic flow meter, and which will provide a source of electric energy having a voltage varying directly as the flow of fluid through the metering device. In the present illustration, the metering device drives a generator 19 which is in circuit with a memory device resistance 23 to be more fully described and a totalizer 26. The transducer delivers instrument quality air in the standard range of, for example, three to fifteen p.s.i.g. but a pressure proportional to the strength of an error signal, as hereinafter described, at any given instant of an error signal sensing device or potentiometer 21. The air from the transducer is fed into the diaphragm pneumatic operator 17. Of course, the transducer 15 will have re-set characteristics and any change in air pressure will cause a movement of the operator 17 in whatever direction is necessary to change the rate of flow through the meter to the point where its output exactly balances the demand at the potentiometer to be hereinafter described. Any unstable condition which would alter the flow, is automatically and immediately sensed by the following apparatus and the necessary compensation automatically taken.

The output voltage of the generator is reduced through suitable resistors 20 to bring it within the operating range of the error signal sensing device or potentiometer 21. A manually variable resistor 22 having its own source of electric energy feeds a signal to one side of the error signal sensing device or potentiometer and the reduced output signal of the generator is fed to the other side of the potentiometer 21. Adjustment of the resistor will allow a demand varying 100% to 0% according to the setting of the variable resistor. The memory device includes a slide wire driven mechanically and automatically by the potentiometer out-put shaft hereinafter described. It is not in any way related to the valve operator nor does it influence the motion characteristics of the valve. The memory device is a part of a computor circuit designed solely to accurately measure the actual mass of fluid lost or gained during a flow rate change. Its actual motion is in a direction and to a degree determined by the error indicated by the potentiometer from the generator signal feeding this circuit. It acts on the potentiometer so as to cause it to accurately add the shortage or subtract the overage in the course of directing the valve controller. The memory device is schematically shown and includes the error signal sensing device or potentiometer 21, a motor 24a actuated by the potentiometer output shaft 24 of the motor, a wiper 25 mounted on and actuated by the shaft and the memory device resistance 23.

The resistance of the memory device resistance 23 which forms part of the circuit is imposed on the generator circuit and the value of the resistance is compensated for in the initial trimming of the resistance 20. When the system is in perfect balance and no potential exists at the potentiometer 21, the wiper 25 will have its pointer resting at the centre of the resistance winding 23. If an interruption causes a reduced flow in the liquid line 12, the potentiometer 21 will go out of balance because of a change in the potential of the current from the generator 19. The error signal will cause the wiper to move its pointer in a direction which will increase the resistance of the generator output circuit. This action of the wiper reflects and exactly duplicates the strength of the error signal. The resistance is calculated so that the extra resistance imposed by the slide wire will use up an electrical force exactly equal to that which exists in the potential of the error sensing device. As the flow comes back on control, the error signal in the potentiometer decreases and at the same time the slide wire instrument reduces its demand upon the generator 19 and meter 18. When the flow has finally reached an exact balance, there will be no potential and no demand upon the meter from the slide wire instrument. In other words, the shortage will be made up completely during the time it takes to come on control and there will be no overrun or hunting action.

If a condition comes into effect causing an extra flow of fluid in the control line, the above control action will take place in reverse. The direction of current flow in the potentiometer 21 will be reversed and the resulting reversal of polarity on the wiped 25 will reduce the resistance on the generator circuit so that the meter will satisfy the potentiometer 21 at a lower flow exactly according to the strength of the potential and a subtraction of liquid will automatically take place while the meter comes back on control and the slide wire transmitter returns to zero (in balance) during the same period. It is, of course, to be understood that the changes in the balance of the potentiometer 21 caused by the error signal will be reflected and used to operate the transducer 15, as shown, to change the air pressure on the pneumatic operator 17 for varying the valve 14 in accordance with a demand for more or less fluid through a conduit 12 to the delivery point 11.

FIGURE 2 is a fragmentary view showing an alternative regulating valve. In that construction, the conduit 12 is provided with a three-way valve 14a and part of the output of the pump is recirculated to the inlet side by means of the balance line 12a which avoids a build-up of pressure in the line between the pump and the valve 14a. The valve 14a is actuated by an electric actuator 27 which is responsive to a transducer 28. The transducer 28 is actuated by the error signal sensing device 21. An interruption which would upset the pre-set balance is thus automatically and immediately compensated.

Figure 3:
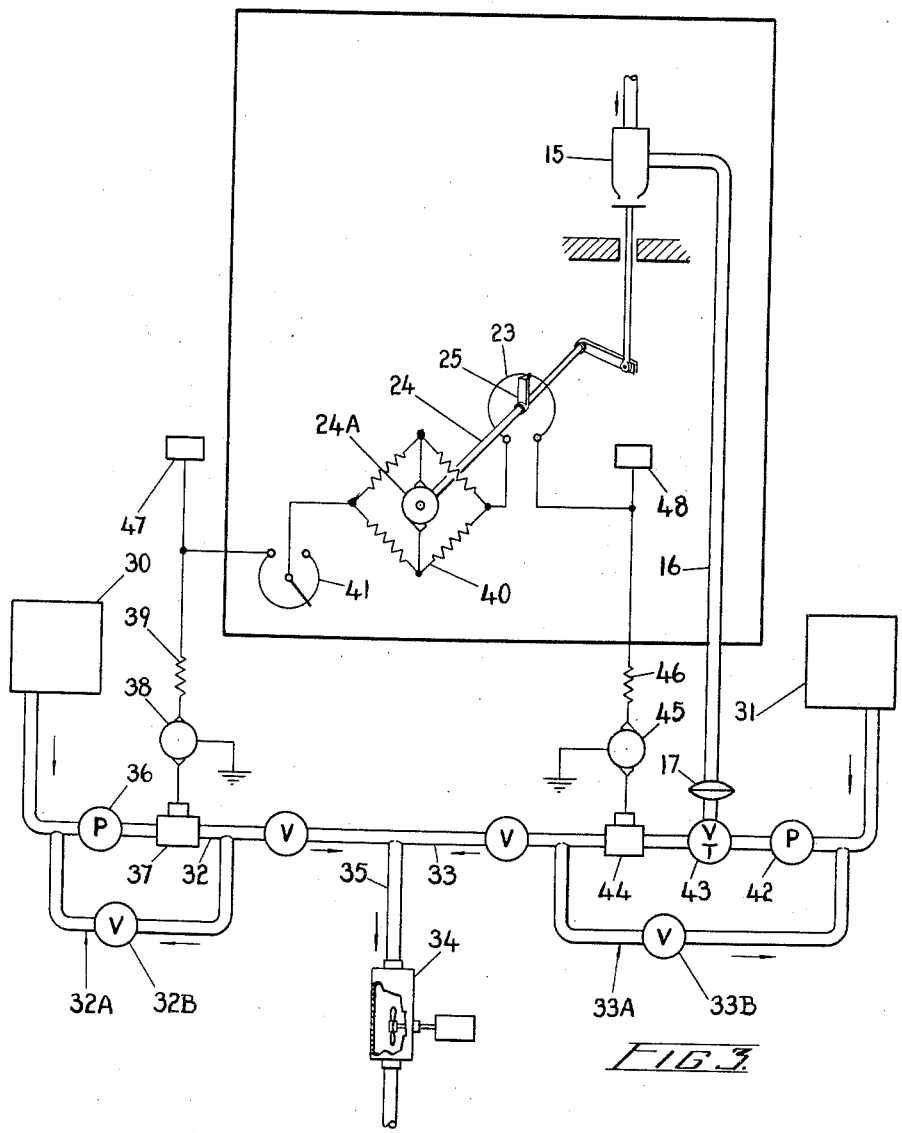
FIGURE 3 is a schematic view showing the application of my apparatus to a blend of two fluid components.

Referring now to FIGURE 3, I have illustrated therein a suitable apparatus for blending two liquids to obtain a blend according to specification with extreme accuracy under unstable conditions common to blending operations. The first fluid component is derived from a source indicated by the numeral 30 and is hereafter referred to as the first source and the source of the second fluid component is indicated by the number 31 and is hereafter referred to as the second source. A first conduit 32 and a second conduit 33 communicate with the first source 30 and the second source 31 respectively, both conduits feeding into a blending device diagrammatically illustrated at 34 by means of a common conduit 35.

In this particular apparatus, the first component of the blend is stored in the first source 30 and is pumped by pump 36 through a positive displacement meter 37 through conduits 32 and 35 to the blending device 34 and from thence to the point of delivery. The flow through the meter is accepted at any rate up to the maximum capacity of the same. The flow is maintained at a constant rate subject, of course, to unstable conditions which will be sensed in the manner hereinafter described.

The loops 32A and 33A having shut-off valves 32B and 33B respectively are provided for calibrating and presetting the meter flow for the blending of the two components.

Mounted on the meter is an electric generator 38 which delivers current having a voltage varying directly according to the speed of the meter and therefore directly according to the flow of liquid through the meter. The output voltage of the generator is reduced through suitable resistors 39 to bring it within the operating range of a potentiometer circuit having a potentiometer 40. Included in the potentiometer circuit between the potentiometer and the resistor 39 is a manually variable rheostat 41. The output of the rheostat 41 is fed into the leading side of the voltage sensitive potentiometer 40 to impress upon the potentiometer an electrical value which will be something less than the output of the generator feeding the circuit. The reason for the reduced value is that it may be compared with the output from a meter generator set in conjunction with a second component of the blend to be hereinafter described, the second component being the lesser of the two values. Adjustment of the rheostat 41 will allow a demand varying 100% to 0% of the flow of the secondary component as hereinafter described which will thus give in effect a blend ratio varying from 50/50% down to 99/1% blend of the two components.

The second component of the blend is pumped from the second source 31 through the pump 42, throttle valve 43, through the second meter device 44 on which is mounted the secondary component generator 45, to the common pipe line conduit 35, to blending device 34, and thence to the delivery point. The output of the secondary generator 45 is fed into the following side of the potentiometer 40, the resistor 46 being provided to reduce the voltage of the generator 45 to bring it within the operating range of the potentiometer. The memory device resistance 23 is interposed in the circuit between the following side of the potentiometer 40 and the resistance 46 so that the output of the secondary component meter (which is the controlled component) is fed through the resistance 23 incorporated in the slide wire instrument 25 and the circuit continues on to the potentiometer 40.

Any discrepancy between the voltages applied at each end of the potentiometer is immediately reflected in an error signal having a value exactly equal to the difference between the two voltages and such error signal will cause the wiper 25 to vary the resistance of the memory device resistance 23.

However, before proceeding to describe the same reference will be made to the valve control in the second source. It will be seen from the drawings that the transducer 15 is actuated by the errior signal sensing device and is responsive to the error signal potential. The transducer 15 delivers instrument quality air in the standard range of 3 to 15 p.s.i.g. but at pressure proportional to the strength of the error signal potential at any given instance. The output air of the transducer is fed into the standard diaphragm pneumatic operator 17 which is operatively connected to the throttle valve 43 of the secondary component line. The transducer 15 will cause a movement of the valve in whatever direction it is necessary to change the rate of flow through the meter to the point where its output exactly balances the demand at the potentiometer. Any interruption of flow of either component, which would upset the balances will be automatically and immediately compensated as hereinafter described.

The memory device hereinbefore described is actuated by the errior signal sensing device and computes the exact amount of the discrepancy and automatically integrates it in the course of correcting the imbalance. This feature is of extreme importance in the application of blending relatively small volumes of product which are to be stored in a truck or railway car. A few gallons shortage in either component will easily put the product beyond the limits of the specifications.

In operation, the memory device is actuated by the error signal sensing device. The output of the secondary component generator 45 is fed through the resistance incorporated in the slide wire instrument and the circuit continues on to the potentiometer. Thus, the resistance of the slide wire is imposed on this circuit and the value of the resistance is compensated for in the initial trimming of the output from the second generator 45 by the resistance 46.

When the system is in perfect balance and no potential exists at the potentiometer, the wiper 25 in the slide wire instrument will have its pointer resting at the centre of the resistance winding. If an interruption causes a reduced flow in the controlled liquid conduit 33 the generator 45 will run slower and an error signal will be produced by the potentiometer which error signal will actuate the wiper 25. That error signal will cause the wiper 25 in the slide wire transmitter to move its pointer in a direction to increase the resistance to the output of the generator 45. The action of the memory device reflects and exactly duplicates the strength of the error signal. The resistance of the circuit is calculated so that the extra resistance imposed by the slide wire instrument will use up an electrical force exactly equal to that which exists in the potential of the potentiometer. The result is that the amount of the error demands an extra output to the same degree from the second meter 44 and its generator 45. This of course changes the setting of the valve 43 so as to demand a greater flow from the second source 31. In speeding up the action of the second component through the meter 44 and generator 45, and coming back onto control, the meter will pass more fluid and the generator 45 will deliver a higher voltage than is apparent at the potentiometer and this extra amount will be exactly what was indicated by the strength of the potential of the error signal. As the flow comes back on control, the error signal in the potentiometer decreases and at the same time the slide wire reduces its demand upon the generator and the meter. A corresponding action takes place on the transducer 15. When the flow has finally reached an exact balance, there will be no potential and no demand upon the generator and the meter from the slide wire instrument.

If a condition comes into effect causing an extra flow of fluid in the controlled line, the above control action will take place in reverse. The direction of current flow in the potentiometer would be reversed and a resulting reversal of polarity on the motor will cause the slide wire to reduce the resistance on the meter generator circuit 45 so that the meter would satisfy the potentiometer at a lower flow exactly according to the strength of the potential and a subtraction of liquid would automatically take place while the meter came back on control and the slide wire transmitter 25 returned to zero during the same period. The output of the two meter generators 38, 45 are also fed into corresponding totalizers 47, 48, which will count the number of gallons passing through each meter and record the accumulated totals.

It is proposed that the meters and valves will be located on the component lines where most convenient. The voltage of the generators is sufficiently high to make substantial transmission distances practical. There would be a cable from each meter and an air line returning to the valve all located outside. The control instruments, all as described, would be mounted in the case. The potentiometer would be equipped with an indicating pointer and this instrument would be so mounted that it would show on the front of the instrument and indicate the degree of control at any time. The flow totalizers would also appear on the instrument panel as would the ratio adjusting variable resistors. The apparatus would also include indicating lights which would show when the system was electrically energized. Lights would also be provided along with pump starting switches so that the operator could start his pumps, set the desired blend ratio and assume full control from this one point. Pressure gauges should be included to indicate the flow conditions from the pumps. The potentiometer instrument would incorporate limit switches complete with indicating lights. The limit switches would be necessary to shut off the two pumps in the event that an uncorrectable condition should occur as it would not be desirable to deliver a product not according to specification. The mixer for the blend would be located outside the juncture of the component lines.

The two component blender described in FIGURE 2 will be applicable in blending any meterable liquid or gases. For certain types of gases and liquids it would be necessary to use other types of meters and transmitters but the basic system as described would not change.

Figure 4:
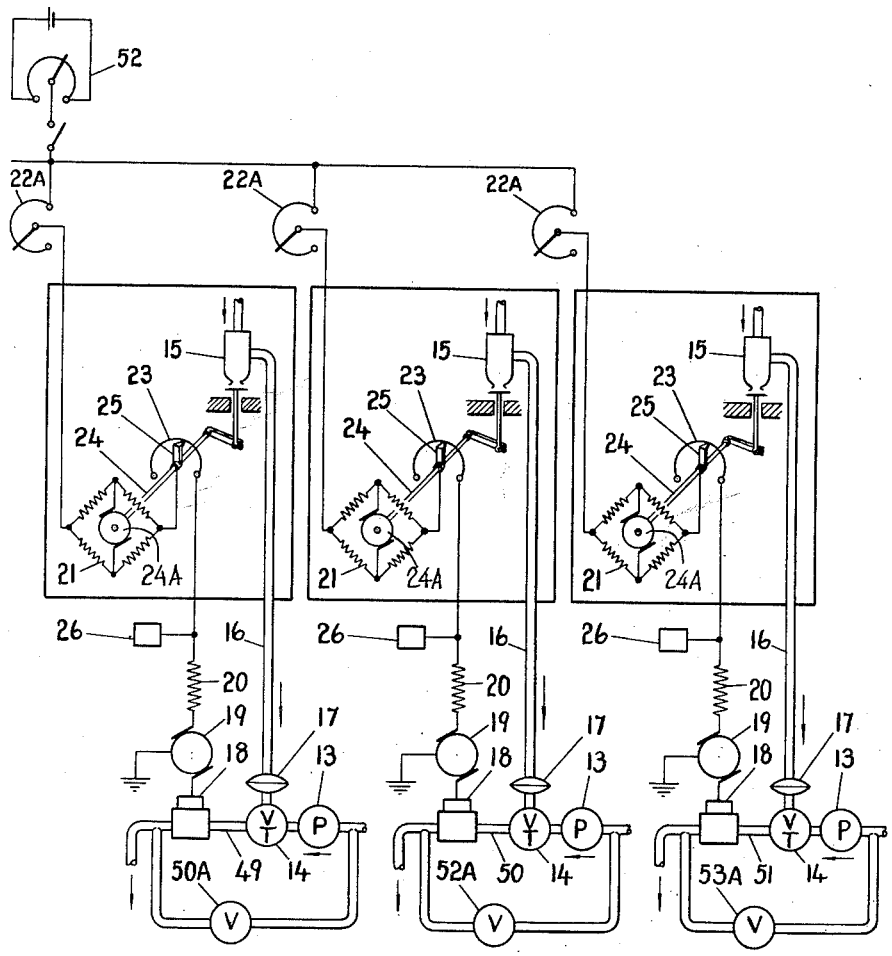
FIGURE 4 shows the apparatus applied for controlling a blend of three or more fluid components.
Figure 5:
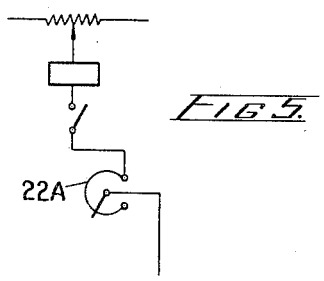
FIGURE 5 shows a potentiometer with balancing slide wire.

Referring now to FIGURE 4, the invention is shown as applied to a blending system wherein three or more components are involved. It is sufficient for the purpose of illustrating the application to show it in connection with three components which are indicated as being supplied through the conduits 49, 50 and 51. The balance of the control elements for each component is exactly the same as in the system described in conjunction with FIGURE 1, except that each of the rheostats 22a do not have their own source of electric energy but are electrically connected to a common source of electric energy indicated at 52. When it is desired to vary the potential of the common source automatically in response to a transmitter which is indicating a change in any variable, such as flow, level, temperature or pressure etc., a manually variable device shown at 52 can be replaced by the potentiometer with balancing slide wire shown in FIGURE 5. That instrument would measure the incoming signal and retransmit it to each of the slave circuits of each of the components. The common electrical value is fed into the potentiometer 21 of each of the circuits through an adjustable resistor 22a and the balance of the control elements is exactly the same as hereinbefore described in connection with FIGURE 1. Adjustment of the variable resistor 22 in each system will allow a demand varying from 100% to 0% in each system. It will thus be seen that a wide blend ratio of the three components can be attained by means of this invention.

The components of the three component lines are delivered to a mixer or blender located outside at the juncture of the three lines 49, 50 and 51.

The three loops having shut-off valves 50A, 52A and 53A respectively are provided for calibrating and presetting the meter flow of each of the three supply conduits 49, 50 and 51 respectively for the blending operation of the three components.

What I claim as new and desire to protect by Letters Patent of the United States is:

1. In an apparatus for automatically and precisely regulating the flow of fluid in a controlled line, in combination, a fluid line communicating with a source of fluid and a point of delivery, a pump for causing fluid to flow from the source to the point of delivery, a source of electric energy having a voltage varying directly as the flow of the fluid, electric energy voltage sensitive means, a circuit for said electric energy voltage sensitive means in circuit with said source of electric energy, a variable resistor associated with said electric energy voltage sensitive means for applying a desired voltage to said voltage sensitive means whereby any departure from the applied voltage produces an error signal, an error signal sensing device including a memory device in circuit with the electric energy voltage sensitive means and responsive to the error signal, a transducer actuated by the error signal sensing device and a fluid regulating valve responsive to the transducer, whereby an interruption which causes a reduced flow of fluid will increase the resistance in the circuit for a period of time equal to the period of duration of reduced flow permitting an additional flow to the amount of fluid lost during the period of reduced flow and reversing the action when conditions cause an increase in flow of fluid.

2. In an apparatus for automatically and precisely regulating the flow of fluid in a controlled line, in combination, a first fluid line communicating with a source of a first fluid and a point of delivery, a pump for causing the first fluid to flow from the source to the point of delivery, a source of primary electric energy having a voltage varying directly as the flow of the first fluid, a second conduit communicating with a second supply and the point of delivery, means blending the two fluids prior to point of delivery, a source of secondary electric energy having a voltage varying directly as the flow of the second fluid, electric energy voltage sensitive means, a circuit for said electric energy voltage sensitive means in circuit with said source of primary and secondary electric energy, for applying a desired voltage to said voltage sensitive means whereby any departure from the applied voltage produces an error signal, an error signal sensing device including a memory device in circuit with the electric energy voltage sensitive means responsive to the error signal, a transducer actuated by the error signal sensing device and a fluid regulating valve responsive to the transducer, whereby an interruption which causes a reduced flow of fluid will increase the resistance in the circuit for a period of time equal to the period of duration of reduced flow permitting an additional flow to the amount of fluid lost during the period of reduced flow and reversing the action when conditions cause an increase in flow of fluid.

3. In an apparatus for automatically and precisely regulating the flow of fluid in a controlled line, in combination, a fluid line communicating with a source of fluid and a point of delivery, a pump for causing fluid to flow from the source to the point of delivery, a metering device, a source of electric energy having a voltage varying directly as the flow through the metering device, a regulating valve in said line between said metering device and the source of fluid and having electrically operated means in circuit with the source of electric energy for controlling the flow of fluid through the valve, electric energy voltage sensitive means, a circuit for said electric energy voltage sensitive means having one side in circuit with said source of electric energy, a manually variable resistor in circuit with the other side of said electric energy voltage sensitive means, said two circuits applying a desired voltage to said voltage sensitive means whereby any departure from the voltage of the source of electric energy produces an error signal, an error signal sensing device including a memory device in circuit with the electric energy voltage sensitive means and responsive to the error signal, a transducer actuated by the error signal sensing device, said regulating valve being responsive to and actuated by the transducer whereby an interruption which causes a reduced flow of fluid will increase the resistance in the circuit for a period of time equal to the period of duration of reduced flow permitting an additional flow to the amount of fluid lost during the period of reduced flow and reversing the action when conditions cause an increase in flow of fluid.

4. In an apparatus for automatically and precisely simultaneously regulating the flow of fluid in each of three or more separate lines, to obtain a specified blend of the fluids the combination of a separate fluid line for each fluid communicating with the source of said fluid and a point of delivery, a separate pump for causing each fluid to flow from the source to the point of delivery, a separate source of electric energy having a voltage varying directly as the flow of the fluid, a separate electric energy voltage sensitive means for each source of electric energy, a separate circuit for each electric energy voltage sensitive means in circuit with its source of electric energy, and a common source of electric energy voltage in circuit with each electric energy voltage sensitive means and having means for varying the voltage thereof whereby a uniform voltage is supplied for each electric energy voltage sensitive means during normal operation, a separate variable resistor associated with each electric energy voltage sensitive means for applying a desired voltage to its voltage sensitive means whereby any departure from the applied voltage produces an error signal, a separate error signal sensing device for each fluid including a memory device in circuit with the electric energy voltage sensitive means and responsive to the error signal, a separate transducer for each fluid actuated by the error signal sensing device and a separate fluid regulating valve responsive to its transducer, whereby an interruption which causes a reduced flow of a fluid will increase the resistance in the circuit for a period of time equal to the period of duration of reduced flow permitting an additional flow to the amount of the fluid lost during the period of reduced flow and reversing the action when conditions cause an increase in flow of the fluid.

References Cited in the file of this patent

UNITED STATES PATENTS

| | | |
|---|---|---|
| 2,509,295 | Glass | May 30, 1950 |
| 2,622,610 | Rowe | Dec. 23, 1952 |
| 2,797,746 | Bourek | July 2, 1957 |